Aug. 24, 1965     A. B. GREATHOUSE     3,202,826
HAZE METER
Filed Sept. 1, 1961
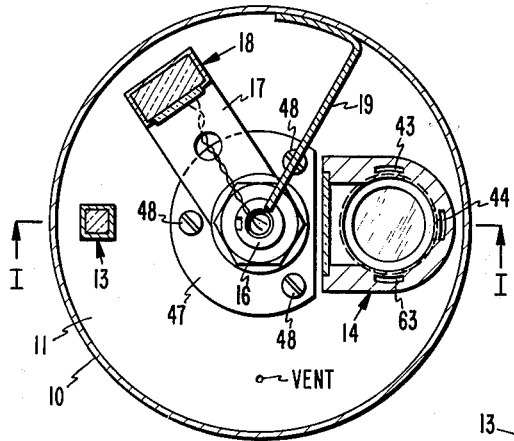
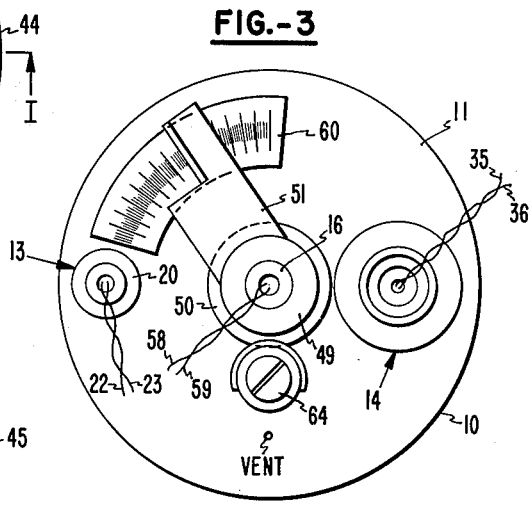
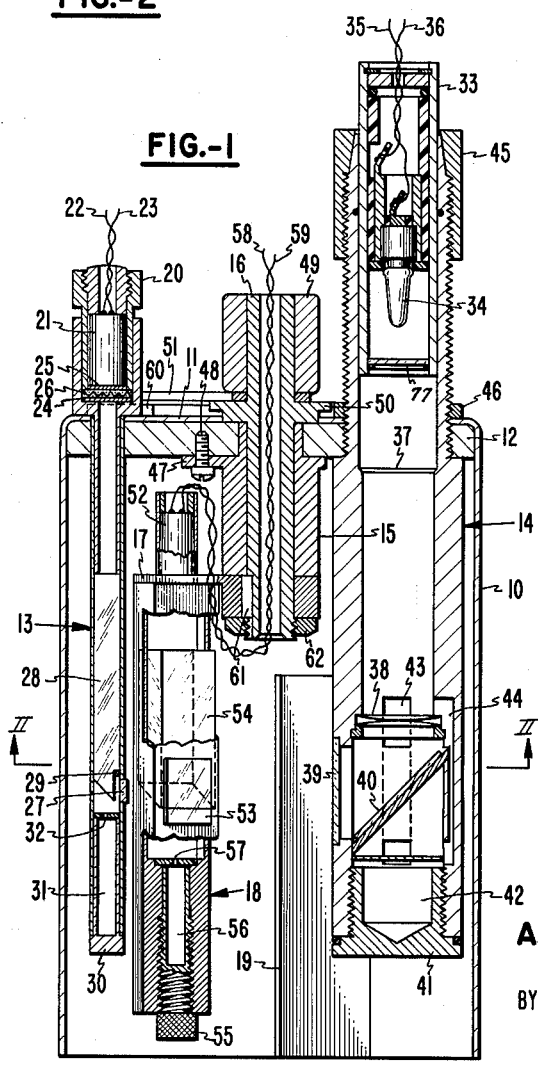
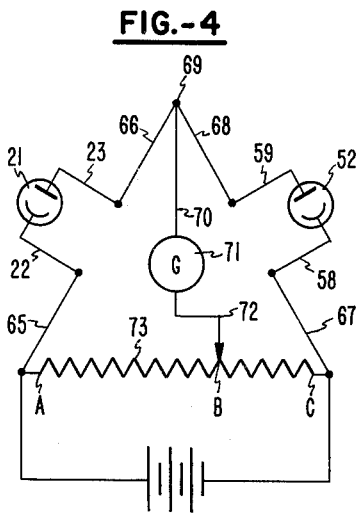
ARTHUR B. GREATHOUSE    INVENTOR
BY David A. Roth
PATENT ATTORNEY United States Patent Office 3,202,826
Patented Aug. 24, 1965

3,202,826
HAZE METER
Arthur B. Greathouse, Scotch Plains, N.J., assignor to Esso Research and Engineering Company, a corporation of Delaware
Filed Sept. 1, 1961, Ser. No. 135,574
7 Claims. (Cl. 250—218)

This invention pertains to a technique for measuring haze in materials, and to apparatus suitable for effecting such measuring. In particular, this invention relates to a method and apparatus for measuring haze in materials by comparing the intensity of radiant energy which has been directly transmitted through such materials, with the intensity of radiant energy which has been transmitted through such materials by scattering from particles capable of causing haze.

The method and apparatus described herein are suitable for use with any material capable of transmitting radiant energy. However, it is particularly applicable to fluid compositions, i.e. liquids and gases. The method and apparatus are especially useful in the quality control of a wide variety of industrial products, for instance, those in the chemical process industries including fuel oils, lubricating oils, hydraulic fluids, aqueous compositions and the like.

THE INVENTION

It has now been discovered that by comparing the intensity of a beam of radiant energy received by direct transmission through a medium, with the intensity of radiant energy received by scattering from haze-causing particles in the same medium, a measure of relative visual haze can be obtained. A common radiant energy source is used. The apparatus and techniques disclosed herein for determining haze can be adapted to actuate either indicating or recording instruments of the electromechanical type, to thereby measure the relative severity of haze. The method and apparatus of this invention will measure haze satisfactorily in materials of any color, and are also effective in materials which are so dark that conventional haze measuring techniques cannot be satisfactorily utilized. Therefore, it is a principal object of the present invention to measure haze in transparent materials.

THE APPARATUS (BRIEF DESCRIPTION)

In its preferred form, the apparatus comprises a vertically extending container, preferably in the form of a cylinder, which is substantially closed at the upper end and open at the lower end to permit easy immersion of the container in the fluid to be evaluated for haze. Mounted rigidly in the closed upper end of the container are two smaller vertically projecting hollow containers or housings having windows through which light or other radiant energy can pass. In these housings are secured a light source and a photoelectric cell, respectively. The light source and photoelectric cell are so positioned that the photoelectric cell can see the light from the light source. A third small housing, also having a window and a photoelectric cell, is movably mounted in the upper closed end of the container. A baffle is rigidly mounted on the side wall of the container so that no directly transmitted light can be seen by the photoelectric cell in the movably mounted housing. Preferably, all the inner surfaces of the apparatus are prepared so as to be nonreflecting, e.g. by painting or by chemically treating. The two photoelectric cells are preferably of the variable resistance type and are electrically connected to a bridge circuit potentiometer which, in turn, can be connected electrically to an automatic recorder. Because of the baffle, the movable photoelectric cell can only see light when there are haze-causing particles present. Thus, the more haze-causing particles there are, the more scattering there is, and thus, more light can be seen by the baffled photoelectric cell. Also, when there is an increase in haze-causing particles, the photoelectric cell that is not baffled sees proportionately less light. Since the resistances of the two photoelectric cells are co-operatively connected to a potentiometer, the potentiometer reading is a measure of relative visual haze.

THE DRAWING

The invention will be further understood by reference to the accompanying drawing which represents a preferred from of the invention.
In the drawing:
FIGURE 1 is a vertical elevational view, in section, of the apparatus, the section being taken on line I—I of FIGURE 2.
FIGURE 2 is a sectional view taken on the line II—II of FIGURE 1.
FIGURE 3 is a top view of the apparatus.
FIGURE 4 is a schematic representation of a bridge circuit potentiometer system for measuring the relative resistances of two photoelectric cells.

THE APPARATUS

Reference is now made to the drawing in detail. As shown in FIG. 1, a cylindrical body or container 10 having nonreflecting inside surfaces, has a substantially closed upper portion 11 to which is rigidly attached a supporting element 12, said closed upper portion 11 and supporting element 12 being vented, and providing a supporting means for:
(A) A housing 13, a portion of which extends downwardly into said cylindrical body 10, and a portion of which extends upwardly from said cylindrical body 10 and which is attached rigidly to said closed upper portion 11 and said supporting element 12.
(B) A substantially tubular housing 14, a portion of which extends downwardly into said cylindrical body 10 and a portion of which extends upwardly from said cylindrical body 10 and which is attached threadedly but rigidly to said closed upper portion 11 and said supporting element 12.
(C) A sleeve 15 within which is rotatably mounted hollow member 16, said hollow member 16 having a lower portion extending downwardly into said cylindrical body 10 and an upper portion extending upwardly from said cylindrical body 10, and said sleeve 15 being rigidly attached to said closed upper portion 11 and supporting element 12. Rigidly but removably attached to the lower end of hollow member 16 is one end of arm 17. The arm has an aperture to allow passage of wires. The other end of arm 17 is rigidly attached to housing 18 which extends downwardly into cylindrical body 10.
(D) A baffle 19 is rigidly attached to the wall of cylindrical body 10 and extends inwardly to just short of the central axis of cylindrical body 10.

A

Said upwardly extending portion of housing 13 is open at the top so as to receive knob 20 which is rotatably and retractably slidable within housing 13. Knob 20 has a central cavity within which cavity photoelectric cell 21 is removably attached. Wires 22 and 23 connect photoelectric cell 21 to a bridge circuit potentiometer illustrated in FIG. 4. Stationary polarizing filter 24 is fixed within housing 13. Stationary polarizing filter 25 is mounted within knob 20 and wire grid 26 is mounted within knob 20 intermediate filter 24 and filter 25. Window 27 is mounted in an opening of housing 13. Prism 28 is mounted within housing 13 so that light can pass through window 27 and be reflected upward to photoelectric cell 21. Prism 28 is mounted on lug 29. The bottom of housing 13 is closed with removable plug 30. Removable plug 30 has a closed chamber 31 which communicates with the rest of housing 13 through air passage 32. A desiccant is placed in chamber 31 which prevents water vapor from fogging the interior of housing 13.

B

The upper portion of substantially tubular housing 14 has light chamber 33 movably mounted within it. Light chamber 33 has a central cavity within which is mounted removable light bulb 34 to which are attached electrical lead wires 35 and 36 which are connected to a source of electrical current. Light chamber 33 is slidable within housing 14 in an upwardly and downwardly direction, but limited to its furthest downward movement to point 37. Lens system 38 is rigidly mounted in housing 14. Window 39 is fixed within an aperture in housing 14 and mirror 40 is angularly affixed within housing 14 in such a manner that a light beam from light bulb 34 is focused by lens system 38, reflected from mirror 40 through window 39 exteriorly of housing 14. The bottom of housing 14 is threaded on the inside so as to receive screw 41, which has a hollow chamber 42. A desiccant can be placed in hollow chamber 42 to prevent water vapor from fogging the interior of housing 14. Air circulation to the desiccant is provided by air passages 43 and 44. Movable light chamber 33 is locked in place with camming nut 45. Also, housing 14 is held even more rigidly in place by nut 46. Movable light chamber 33 is also provided with an aperture 77 which is adapted to hold a plain transparent window or various different colored light filters.

C

Sleeve 15 is rigidly attached to supporting element 12 by a series of three set screws 48 through flange 47 which is integrally connected to sleeve 15. Of the three set screws only one can be seen. Knob 49 is rigidly attached to hollow member 16. Integrally connected with said hollow member 16 is circumjacent flange 50. Projecting vertically from hollow member 16 and rigidly attached to said hollow member 16 and circumjacent flange 50 is indicating arm 51. Rotation of hollow member 16 within sleeve 15 causes housing 18 to move in a curved path at a fixed distance from the longitudinal axis of hollow member 16. Rigidly, but removably mounted within housing 18 is photoelectric cell 52. In an aperture of housing 18 is window 53 and behind window 53 is prism 54. The bottom of housing 18 is threaded on the inside so as to receive screw 55 which has a hollow chamber 56. A desiccant can be placed in hollow chamber 56 to prevent water vapor from fogging the interior of housing 18. Hollow chamber 56 has an air passage 57 to allow air contact with the desiccant. Photocell 52 has connected to it wires 58 and 59 which pass through the top of housing 18 through the aperture of arm 17 and up longitudinally through the bottom of hollow member 16, and through the top of hollow member 16 to the potentiometer shown in FIG. 4. Degree scale 60 is rigidly attached to closed upper portion 11. Arm 17 is rigidly attached to hollow member 16 by means of a key 61 in a keyway and a nut 62.

FIGURE 2

In FIG. 2, which is a sectional view of FIG. 1 taken along line 2—2, the elements which are common to FIG. 1 are cylindrical body 10, housing 13, housing 18, substantially tubular housing 14, baffle 19, arm 17, screws 48, air passages 43 and 44 and hollow member 16. Air passage 63 and two screws 48 are not shown in FIG. 1.

FIGURE 3

In FIG. 3, which is a top view of FIG. 1, the elements which are common to FIG. 1 are cylindrical container 10, closed upper portion 11, housing 14, indicating arm 51, housing 13, knob 20, wires 22, 23, 58, 59, flange 50, degree scale 60, hollow member 16, and knob 49. Ground terminal screw 64 is shown for the first time in FIG. 3 and serves a dual purpose of connecting ground wires to cylindrical container 10 and locking hollow member 16.

FIGURE 4

In FIG. 4, a schematic of a potentiometer bridge circuit is shown. Wire leads 22 and 23 of photoelectric cell 21 are attached to wires 65 and 66 respectively. Wire leads 58 and 59 of photoelectric cell 52 are attached to wires 67 and 68 respectively. At point 69 wire 70 is connected to galvanometer 71 which is connected to wire 72 which is slidably attached to wire 73 of known resistance. Wire 73 is connected to wires 65 and 67 in parallel circuit and a 45 volt battery is attached to the ends of wires 65 and 67 to complete the circuit and provide the E.M.F. to operate the bridge circuit.

It will be seen from the above description when read in conjunction with the drawing that housing 14 serves as a source housing that isolates the source of light or radiant energy from contact with fluid in container 10 and that window 39 is so positioned that radiant energy will be directed in a generally lateral direction into fluid within container 10. It will also be seen that housing 13 constitutes a first detector housing that is spaced laterally from the source housing 14. Housing 13 serves to isolate the photoelectric cell or detector 21 from the fluid in container 10. Window 27 is so positioned that it places detector 21 in alignment with the direct energy path from window 39. Housing 18 is spaced laterally from housing 14 and also from housing 13 and constitutes a second detector housing which isolates cell or detector 52 from fluid within container 10. Window 53 is so aligned with detector 52 that it defines therewith a scattered energy path that is out of alignment with the direct energy path running from window 39 to window 27. The angle between the direct energy path and the scattered energy path can be changed by shifting the position of housing 18 by means of knob 49, as described. The amounts of radiant energy received by detectors 21 and 52 are compared by means of the potentiometer bridge circuit.

OPERATION OF THE APPARATUS

In a preferred method of operation, cylindrical container 10 is lowered into a vessel holding a visually clear sample. Knob 49 is turned until housing 18 is at a desired angle from housing 13 as measured from the central axis of cylindrical container 10, or in other words, until the angle between the direct energy path and the scattered energy path is at a desired value. This angle is indicated by arm 51 and scale 60. A particularly preferred angle is about 17°. Knob 49 is then locked by screw 64. Bulb 34 is turned on, and light chamber 33 is adjusted so that the light emitted from window 39 is substantially columnar. Knob 20 is then turned to cause polarizing elements 24 and 25 to attenuate the amount of light seen by photoelectric cell 21. Photoelectric cells 21 and 52 are of the type whose resistance is inversely proportional to the light intensity striking them. In a visually clear sample, the amount of light entering window 27 is substantially greater than that entering window 53 because baffle 19 prevents direct light from entering window 53. The attenuation of polarizing filters 24 and 25 is regulated so that the amount of light seen by photoelectric cell 21 is only slightly more than seen by photoelectric cell 52. A potentiometer reading is then made. All settings are allowed to remain as they were for the visually clear sample, and the cylindrical container 10 is then lowered into an extremely hazy sample. A potentiometer reading is then made. The apparatus is then lowered into each sample to be evaluated and a potentiometric reading made. All subsequent readings in other samples can then be evaluated with respect to the two readings taken in the clear sample and the extremely hazy sample.

The bridge circuit potentiometer can be a type as shown in FIG. 4 or can be any other type including those commercially available such as an automatic recording type or an indicating type.

In order to calibrate the haze meter apparatus and evaluate the significance of the bridge circuit potentiometer readings it is necessary to point out the relationship of the photoelectric cells to the bridge circuit. After the bridge circuit has been balanced by moving the dial (i.e. sliding wire 72 along resistance wire 73) until there is a zero deflection on the galvanometer, the resistance of photoelectric cell 21 will be proportional to the distance AB on resistance wire 73, and the resistance of photoelectric cell 52 will be proportional to the distance BC on resistance wire 73. Since the resistance is inversely proportioned to the light intensity received by the photoelectric cells, the greater the light intensity, the less the resistance. Moreover, in the bridge circuit, the resistance of photocell 21 is to the resistance of photocell 52 as the length AB is to the length BC. Therefore, $$\frac{R \text{ of photocell } 21}{R \text{ of photocell } 52} = \frac{AB}{BC} \text{ or } \frac{R \text{ of photocell } 52}{R \text{ of photocell } 21} = \frac{BC}{AB}$$

In the initial attenuation of photocell 21, it is desired to make an adjustment so that photocell 21 sees slightly more light than photocell 52 when both are in a clear solution. Under such conditions the ratio of $BC/AB$ is adjusted so that it is more than 1, i.e. 1.5 to 30, e.g. 2 or 15. When the amount of haze increases, the amount of light seen by photoelectric cell 21 decreases; therefore increasing the resistance of the cell; and the amount of light (scattered) seen by photocell 52 increases, therefore decreasing the resistance of photoelectric cell 52. Under such conditions as the quantity of haze increases the ratio of $BC/AB$ becomes smaller until, finally, under extreme conditions of haze it can become as low as 0.01. On the potentiometer, either calculation of $BC/AB$ can be made, or direct scale readings can be taken.

Another satisfactory method of evaluating haze is to attenuate the light received by photoelectric cell 21 in a clear solution until the pointer of the potentiometer is 0. The increase of haze is then the deflection of the pointer from 0.

DEFINITIONS AND ALTERNATIVE COMPONENTS OF THE APPARATUS

The above-described apparatus is conveniently suited for lowering into a container holding the fluid to be evaluated. A normally solid material can also be tested in the apparatus. Moreover, the apparatus and method of the invention are operable under flow conditions as well as static conditions and, therefore, can be used in a pipe line for suitable purposes, e.g. quality control. The apparatus and method of the invention are also suitable for controlling chemical reactions. For instance, if a certain reaction product were a precipitate, its formation and rate of formation would be ascertainable.

In lieu of the polarizing lens or filter of the preferred embodiment, other attenuating means can be used, such as an adjustable diaphragm, special lenses, and other materials that inhibit the transmission of radiant energy. A photoelectric cell of reduced sensitivity can also be used.

Haze, as referred to herein, refers to a lack of transparency or clarity in a material, which lack is often caused by the presence of optical inhomogeneities which impart a turbid appearance to transparent materials when viewed by the eye.

In general, the method of determining the relative severity of haze or optical inhomogeneities in a material comprises measuring the ratio of directly transmitted light received to scattered light received. When the ratio of directly transmitted light received to scattered light received is high, the quantity of optical inhomogeneities present is relatively small. When the ratio of directly transmitted light received to scattered light received is relatively small, the quantity of optical inhomogeneities is relatively large.

In order to determine the relative intensity of the radiant energy source passing through a transparent medium, any electronic device which will respond to radiant energy can be used. Examples of such devices include the photoelectric cell, as illustrated in the preferred embodiment of the invention, photovoltaic cells, photoconductive cells, photoelectric tubes, photomultiplier tubes, thermopiles, bolometers, and the like.

Radiant energy, as used herein, refers to those wave lengths encompassing gamma rays, X-rays, infrared rays, visible and ultraviolet light; that is, those electromagnetic radiations having wave lengths between 0.01 to 1,000,000 Angstroms, e.g. 100 to 1,000,000 Angstroms.

Scattered radiant energy means radiant energy which has been caused to deviate from the direction of the incident beam through diffraction, or reflection, or refraction, and/or by any combination of the three, by reason of suspended or dispersed particles (optical inhomogeneities).

A significant advantage of this invention is that the color of the material to be evaluated for haze does not influence the ultimate haze measurement. A further advantage of this invention is that colloids and other macromolecules do not interfere with haze evaluation, as often happens with other instruments such as a nephelometer.

Example 1

In order to demonstrate the apparatus and method of this invention, the following tests were carried out.

Twelve samples to be evaluated were selected. These samples were visually evaluated for severity of visual haze, in ascending order of haze severity, by six observers. The clearest sample was given 1 demerit. The haziest sample was given 12 demerits. The same samples were also evaluated in the Hellige Turbidimeter which is an instrument commercially available from Hellige Inc., Garden City, New York. The samples were also evaluated in an apparatus constructed according to FIGURES 1, 2, 3 and 4. The component parts of the apparatus included:

2 Clairex crystal photoelectric cells CL– 47 of the light sensitive resistance type
1 Heliopot potentiometer (100,000 ohms)
1 45-volt battery as the power source for the Heliopot potentiometer
1 6-volt light bulb The photoelectric cells were arranged so that they were 17° apart from each other. The Heliopot potentiometer has a movable dial pointer on a scale. As the bridge circuit is balanced, the resultant scale reading is a measure of relative visual haze.

The samples tested, and the data pertaining to relative haze therein, are as follows:

| Sample | Color | Haze-meter [3] | Hellige Turbidimeter | Average Visual Demerit |
|---|---|---|---|---|
| Estor HD-30 [1][2] (dark heavy-duty motor oil). | Black-Opaque. | 2 | 4 | 3.0 |
| Estor D-3 HD-30 [2] (dark heavy-duty motor oil). | Brown | 2 | 5 | 1.8 |
| 10 wt. percent of a chlorinated wax condensed with naphthalene in a neutral mineral oil having a viscosity of 150 SUS at 100° F. | Dark Red | 5 | 5 | 2.5 |
| A 50/50 mixture by volume of refinery mineral oils having a viscosity at 210° F. of 60 SUS and 78 SUS and 100 parts per million of water. | Yellow | 5 | 7 | 4.7 |
| A neutral mineral oil having a viscosity of 150 SUS at 100° F. | Light Yellow | 6 | 5 | 3.3 |
| Shell X-100 10W-30 [2] | Dark Red | 7 | 17 | 9.2 |
| Uniflo 10W-30 [2] | Light Brown | 9 | 14 | 7.8 |
| Super Permalube 10W-30 [2] | Orange | 11 | 12 | 6.8 |
| 10 wt. percent of a copolymer of vinyl acetate, maleic anhydride and alkyl fumarate in a neutral mineral oil having a viscosity of 150 SUS at 100° F. | Yellow | 22 | 22 | 8.2 |
| Lubrizol 56 [1][2] | Black-Opaque. | 24 | 10 | 8.0 |
| A refined mineral oil having a viscosity of 80 SUS at 210° F. | Yellow | 61 | 65 | 10.8 |
| Lubrizol 56 [1][2] (A different batch than that above). | Black-Opaque. | 69 | 30 | 12.0 |

[1] Samples were so opaque that it was necessary to dilute them 50/50 with a light mineral oil before making the comparisons.
[2] Commercially available product.
[3] These readings are direct readings on the Heliopot potentiometer.

The difference in readings obtained with the second Lubrizol 56 sample indicates the difficulty encountered in conventional turbidimeters in evaluating haze in a highly colored material. It should also be noted that there was a wide divergency in the six-party visual evaluation of the Shell X-100 sample.

For some unusual samples with relatively large particles it has been found that better results are obtained if the angle between the direct energy path and the scattered energy path is between 3° and 16°, e.g. 5° and 12°.

What is claimed is:

1. An apparatus adapted for immersion in a fluid to measure haze therein, which comprises in combination:
    (a) a vertically extending container substantially closed at its upper end and open at its lower end,
    (b) a source of radiant energy carried within said container,
    (c) a source housing isolating said radiant energy source from contact with fluid in said container and having a window positioned to direct radiant energy in a path having a generally lateral direction into fluid within said container,
    (d) a first detector of radiant energy carried within said container at a position spaced laterally from said radiant energy source,
    (e) a first detector housing isolating said first detector from fluid in said container and having a window in alignment with said first detector and the direct energy path,
    (f) a second detector of radiant energy carried within said container at a position laterally spaced from said energy source and from said first detector,
    (g) a second detector housing isolating said second detector from fluid in said container and having a window aligned with said second detector and defining therewith a scattered energy path which is out of alignment with the direct energy path, and
    (h) means responsive to said first and second detectors for comparing the amounts of radiant energy received by said detectors.

2. An apparatus as defined by claim 1 including means for moving said second detector and its housing whereby the angle between the direct energy path and the scattered energy path can be changed.

3. An apparatus as defined by claim 2 wherein the direct energy path and the scattered energy path define an acute angle.

4. An apparatus as defined by claim 3 wherein said angle is between about 3° and about 17°.

5. An apparatus as defined by claim 1 wherein said means for comparing the amounts of radiant energy received by the respective detectors comprises a bridge circuit potentiometer.

6. An apparatus as defined by claim 1 including means for attenuating the amount of radiant energy reaching said first detector.

7. An apparatus as defined in claim 1 wherein said first and second detectors comprise photoelectric cells, and wherein said source of radiant energy emits visible light.

References Cited by the Examiner

UNITED STATES PATENTS

| 1,883,116 | 10/32 | Tomlinson | 250—218 X |
| 2,323,128 | 6/43 | Hare | 250—83.4 |
| 2,395,482 | 2/46 | Hurley | 250—220 X |
| 2,464,211 | 3/49 | Cahusac et al. | 250—218 X |
| 2,654,845 | 10/53 | Presenez | 250—210 X |
| 2,977,478 | 3/61 | Wapperman | 250—83.4 |
| 3,027,461 | 3/62 | Kavanagh | 250—218 |

RALPH G. NILSON, *Primary Examiner.*

WALTER STOLWEIN, *Examiner.*